May 18, 1965   B. D. STANTON   3,184,686
OPTIMIZING CONTROLLER
Filed Aug. 28, 1961   2 Sheets-Sheet 1

INVENTOR:
B. D. STANTON

BY: Oswald H Milmore
HIS ATTORNEY

May 18, 1965   B. D. STANTON   3,184,686
OPTIMIZING CONTROLLER

Filed Aug. 28, 1961   2 Sheets-Sheet 2

INVENTOR:
B. D. STANTON.
BY: *Oswald H Milmore*
HIS ATTORNEY

United States Patent Office 3,184,686
Patented May 18, 1965

3,184,686
OPTIMIZING CONTROLLER
Benjiman D. Stanton, Walnut Creek, Calif., assignor to Shell Oil Company, New York, N.Y., a corporation of Delaware
Filed Aug. 28, 1961, Ser. No. 134,396
11 Claims. (Cl. 328—69)

This is a continuation-in-part of my copending application Serial No. 24,508, filed April 25, 1960, now abandoned.

The invention relates to a system and apparatus for controlling a process in such a way that as a result of this control the process is carried out at the optimum, viz., the most efficient operating conditions.

In recent years the use of apparatuses for controlling various technical processes such as chemical processes, processes for the distillation, extraction and refining of petroleum and the like, have been developed. With the help of these apparatuses certain variables of the process may be measured and certain inputs controlled to enable the said proces to be driven in the most economical (optimum) manner. These apparatuses have always included a large analogue or digital calculating machine which automatically utilizes the values of the measured variables and provides the values used in adjusting the inputs.

While various apparatuses of this type have been used they involve very expensive equipment. Accordingly the use of these apparatuses is unwarranted in many relatively simple processes having only a few inputs and measured variables. Thus, there remains a large number of processes which could be controlled automatically if a simplified system were available.

The invention now provides a system for controlling a process by means of a simple controller in such a way that the result of the process is constrained or maintained at or in the region of an optimum value.

The process to which the invention applies should have at least one and preferably two manipulated inputs; these are sometimes called "controlled variables" or "manipulated variables." Furthermore, there is a constrained variable the momentary value which should be maintained within certain limits; as a rule this variable should not exceed or fall below a desired value, at least not to any considerable degree (which degree may however have a preset threshold value). This variable is sometimes called the "measured variable" and may be, for example, the quality of the product being produced in a chemical process or the exit temperature of a furnace. In some cases there are two (or even more) constrained variables.

In contrast, the manipulated inputs are varied depending upon the value of the measured variable. They can be adjusted to obtain an optimum operating point for the process. Thus, controlling at least one of these inputs directly affects the result (the magnitude to be optimized) of the process on the one hand, and on the other indirectly influences the value of the measured variable.

For example, it may be desired to operate a chemical process to attain the maximum profit, which is the yield less costs. Often the cost may, with sufficient accuracy, be regarded as fixed (as when the value of the reaction product is high) and the goal becomes the maximum yield, considered as quantity or as the product of quantity and quality. The amount of reaction product can be increased by increasing the input, such as feed stream and/or heat, to the process, but the amount of input should not be increased beyond the point where the product quality falls below certain specified limits. The quality in this case is the constrained variable. Another example involves the goal of attaining a minimum in operating cost, such as the amount of fuel supplied to a furnace for a given load. Thus, one usually adjusts the flow of fuel to a furnace to maintain its exit temperature (the constrained variable) within certain set limits, but the air flow must also be adjusted to insure combustion at optimum efficiency. This example differs from the first in that one of the inputs (fuel) may be regarded as the quantity to be optimized.

The principal object of the invention is to provide an optimizing controller for a process having a constrained variable and one or more manipulated inputs.

A further object is to provide an optimizing controller which maintains a constrained variable within preset limits while it drives a manipulated input in the direction required to advance the process towards an optimum operating point and beyond said point (with a concomitant impairment in the value of the constrained variable) and then reverses the direction of change to drive the said input back to and beyond the optimum point (and improve the constrained variable).

Still another object is to provide an optimizing controller which utilizes an electrical signal which is related to the measured value of the constrained variable, compares this signal with a preset value, e.g., a signal, and applies the resulting difference signal to a controller which, when the difference signal indicates a favorable condition, integrates the difference between said difference signal and a constant signal of relatively small amplitude, the output from the integrating unit being employed to drive the process toward and beyond an optimum operating point; and which, when the difference signal indicates an unfavorable condition, reverses its operation and, instead, integrates a large-amplitude signal, e.g., the difference signal, to drive the process beyond the optimum point in the opposite direction.

Still another object is to provide an optimizing controller which utilizes pneumatic relays to produce the said difference-signal and to effect the said integrating functions.

A further object is to provide an optimizing controller as indicated in either of the two immediately preceding paragraphs wherein the difference signal is effective to indicate an unfavorable condition in the measured, constrained variable only when its deviation from a preset value exceeds a threshold value, so that noise, caused, for example, by random variations in the measured value due to process dynamics or characteristics of the controllers, will not cause undesired reversals in the functioning of the integrating unit.

According to the invention an effective control is achieved by comparing the momentary measured value of the constrained variable with the desired value thereof to obtain a difference-signal and, if necessary, amplifying the difference-signal, which represents the relation between these values (i.e., it may in some embodiments be proportional to the difference, or may in others assume one of two values determined by the results of the comparison); the difference signal thus obtained or a signal derived therefrom drives a device which, depending on the nature of this signal, is capable of supplying an output or control signal which either increases relatively slowly in one direction (when the measured variable has a favorable momentary value) or increases relatively rapidly in the other direction (when the measured variable has an unfavorable momentary value); and the output signal of this device is used for controlling the manipulated input.

If there are more, for example, two manipulated inputs, one can be controlled by means of conventional control devices which are responsive to the difference between the momentary value and the desired value of the measured variable, and the output signal described in the preceding paragraph is used to control the other input.

In principle, there may be more than one constrained or measured variable. In case of, for example, two constrained variables a second difference signal determined by the difference between the momentary and the desired value of the second constrained variable is also determined and if necessary amplified; the second difference signal or one derived therefrom is also led to the said device, which is capable of supplying the output signal which either increases relatively slowly in one direction or increases relatively rapidly in the other direction.

For the sake of simplicity it will be assumed hereinafter that the momentary value (M) and the desired or preset value (I) of the constrained variable are both positive magnitudes, that the momentary value should not be smaller, at least not considerably smaller than the desired value, and that the difference $(M-I)$ is being determined, the difference thus being positive, when $M > I$ and negative when $M < I$. It will be clear that instead of the difference $(M-I)$ the algebraical sum of M and $-I$ can be determined.

These assumptions are only made in elucidation of the invention. The invention will obviously work in a corresponding manner if one starts from other assumptions. (For example, if M should not be greater than I, as when M represents an undesirable property or amount, the difference $(I-M)$ is determined.)

Favorable values of the measured variable are any values when $M \geq I$ and moreover the value when $M < I$ at which a threshold value (which may be adjusted or selected in any particular instance) of the now-negative difference $(M-I)$ is still not exceeded. The other values of M are unfavorable values for the measured variable. It is, however, not always necessary to introduce a threshold value; without the threshold value any value $M < I$ is unfavorable.

The momentary value (M) of the constrained variable is supplied to the optimizing control system according to the invention in the form of an electric, pneumatic or other type of measurement signal (depending on the measuring system or transducers used). The control system receives a message, for example, in the form of a signal which is related to the desired magnitude (I) of this variable. If, for example, the constrained variable relates to the quality of the product manufactured the desired value may represent the lowest permissible quality of the said product. The difference $(M-I)$ between these two values is then determined and usually amplified.

The difference signal, or a signal derived therefrom, is a driving signal and drives an output device which is capable of supplying two different kinds of signals. Whether one or the other is supplied depends on the nature (magnitude, direction or polarity) of the difference signal. If no threshold value is introduced the difference signal may (directly or indirectly) drive the above device. If a threshold value is used the apparatus is driven by the derived signal in which the said threshold value is incorporated.

On passing the value $M=I$ the difference signal may change its polarity or direction thereby causing a reversal from one type of output signal to the other. It is, however, also possible that a signal derived from the difference signal varies in magnitude only and that a difference in magnitude in the said signal causes the reversal in the operation of the output device.

Similar observations apply when the value $M=I-d$ is passed when a threshold value is introduced, $d$ representing the threshold value.

So long as the value of M is favorable the said output device produces an output signal which increases relatively slowly in one direction and, so long as the value of M is unfavorable, an output which increases relatively rapidly in the other direction. For the sake of simplicity it is hereinafter assumed that the slow increase occurs in the positive direction and the rapid increase in the negative direction. It should be observed, however, that the output signal of this device need not necessarily reverse its polarity or direction when changing over from one type of signal to the other one. The output signal may be, for example, a pneumatic pressure signal, which signal (bearing in mind the above assumption), slowly increases in magnitude when M is favorable and rapidly decreases in magnitude when M is unfavorable. This output signal is now used for controlling the manipulated input to the process being optimized. The signal is, of course, used in such a way as to lead the controllable variable in a direction in which the result of the process, viz., the magnitude to be optimized, is driven to the optimum operating condition.

The said threshold value is introduced primarily to prevent reversals of the operation of the integrating device due to those changes in the difference signal which are the result of noise in the measurement signal. This threshold value is preferably adjusted to the minimum consistent with the dynamics of the process. Thus, a process which produces large fluctuations in the measured value of the constrained variable requires a large threshold value while the latter would be almost zero in the case of a noise-free measurement signal.

The speed with which the output signal rises and falls also depends upon the dynamics of the process and may be adjusted. For example, after the process has been driven beyond its optimum point it should be brought back as rapidly as possible. However, the manipulated variable controlled by the output signal should not be reduced significantly faster than the process can respond. The rate of increase in the signal (again bearing in mind the foregoing assumptions) is made slower than the decrease, usually by a factor of three to fifteen.

This may be exemplified by a chemical process in which the feed is one manipulated input, heat a second manipulated input, and the yield magnitude to be optimized. A maximum output is desired without the quality (the constrained variable) of the product falling below a minimum limit. The control apparatus according to the invention will now drive the feed continuously in one direction (in this case allow it to increase) while the heat input is adjusted continually, preferably automatically, to maintain the quality constant. Eventually, for any of several possible reasons, the control of the latter input fails to maintain the quality within the set limit. At this point (if necessary taking into account a certain threshold value) the said output device reverses its operation and the output signal of the said device changes from slowly increasing to rapidly decreasing. As a result the magnitude of the first manipulated input will be reduced as rapidly as possible, consistent with the process dynamics, so that the quality of the product returns to the desired value. When the quality momentarily exceeds the set limit the said other manipulated input is adjusted (at first in the opposite direction) to maintain the quality constant. The control cycle repeats itself. Hence in the favorable period for M the process is driven slowly towards the optimum, and when the process has passed this optimum point the earlier situation is again rapidly restored. Thus the control system is constantly oscillating in a very narrow range about the optimum point.

Among the possible reasons previously mentioned for failure of the second manipulated input to maintain the constrained variable constant is the relation between said input and the variable (wherein the former may improve the latter progressively until a maximum point is reached, after which a further increase may have no further effect or may impair the variable). Also, the physical limitations of the equipment may be such that the manipulated variable cannot be increased indefinitely.

The invention and the preferred control equipment will now be illustrated with reference to the drawings wherein.

Figure 1:
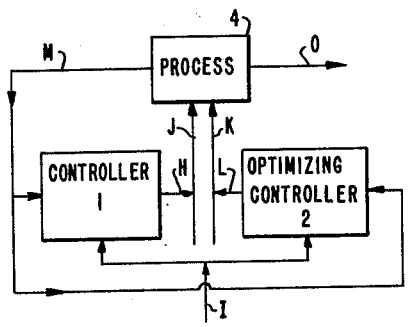
FIGURE 1 is a block diagram showing a process which is controlled according to the invention.

Referring to FIGURE 1, the process represented by the block 4 may be, for example, any chemical process having a constrained variable which is measured and has, at any moment, a value M given by a measurement signal; and two manipulated inputs J and K. The magnitude O is the output to be optimized, viz., the amount of product delivered. M represents the quality of the product which should not fall below the assumed desired value I, at least not to any considerable extent. The two inputs J and K both control the result of the process O and the variable M; they may represent respectively the heat and the feed supplied.

Two control devices 1 and 2 are shown diagrammatically, the first being a conventional controller for controlling the input J by a control signal H and the second an optimizing controller according to the invention for controlling K by a signal L. Both controllers form control loops and both are given both the momentary value M and the desired value I.

Controller 1 may be of any known or suitable type and works in a known manner: It compares values of M and I, e.g., by determining their difference, and emits the output signal H to adjust J in accordance with whether $(M-I)$ is positive or negative. It is assumed, by way of example, that the controller 1 increases J when $M<I$ and reduces it when $M>I$, although the opposite may in certain cases be true.

Controller 2 is an embodiment, described below, of the control system according to the invention. The output signal L of this system controls the feed flow K. In accordance with the above assumptions, K increases as L increases and vice versa. This control need not be direct, but if desired may be an indirect one via a further controller 3 (FIGURE 2) in which, for example, the momentary value of O is a factor and which produces a modified output signal L' for controlling K.

Figure 3:
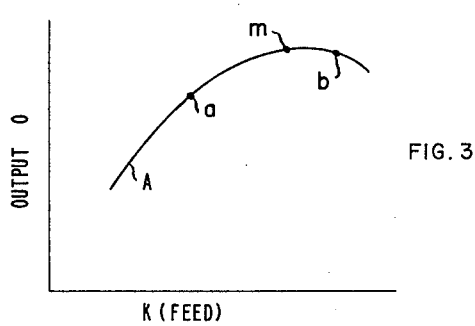
FIGURE 3 is a graph illustrating a possible relation between the quantity to be optimized and the manipulated input K which is controlled by the optimizing controller.

The operation of the above process is illustrated in FIGURE 3, wherein ordinates give the quantity O (output) to be maximized and the abscissae corresponding values of K. (The output may be the product of quantity and quality; however, since quality is held nearly constant, it may also be regarded as representing the said product of quality and quantity.)

In the initial condition it is assumed that $M=I$ and that K has a value to the left of the crest of the curve A, e.g., a point $a$. Controller 2 increases K slowly. This causes a transient drop in M; however, this is immediately corrected by the controller 1, which increases J, to maintain M substantially constant. (This transient impairment in M is not at this time taken cognizance of in the controller 2 by virtue of the use of a threshold value therein and/or by adjusting the controller 1 to maintain M at a value slightly above I, so that M during this phase never actually falls below I.)

Eventually the yield reaches the maximum level at point $m$. Beyond this point a transient drop in M can no longer be corrected by controller 1, e.g., because increased heat input causes the formation of undesired reaction products, and leading to a decrease in output. Impairment in M may also be attributed to excessive feed, leading to incomplete reaction, or to a combination of too high values for both K and J. Whatever the cause, the value of M and O falls off and the operating point is brought to $b$. At this point M is so much smaller than I that the threshold value in the controller 2 is exceeded and this reverses operation to change L (and, hence, K) by an amount sufficient to drive K to the left of the peak in the curve. This reduction in K is more rapid than the previous increase. As a result M again rises; any transient rise in M above I is corrected by the controller, which decreases J to make $M=I$. Conditions are therefore returned to those at the start; controller 2 again reverses operation and the control cycle is repeated. The result is that a maximum in yield is slowly reached, and that an oscillation of small amplitude is affected about the optimum point $m$.

It may be noted that J may change progressively, e.g., increase while K is changing from $a$ to $b$, or may reach a peak value and remain there, depending on the system. The invention is not limited to any specific behaviour of J.

Figure 4:
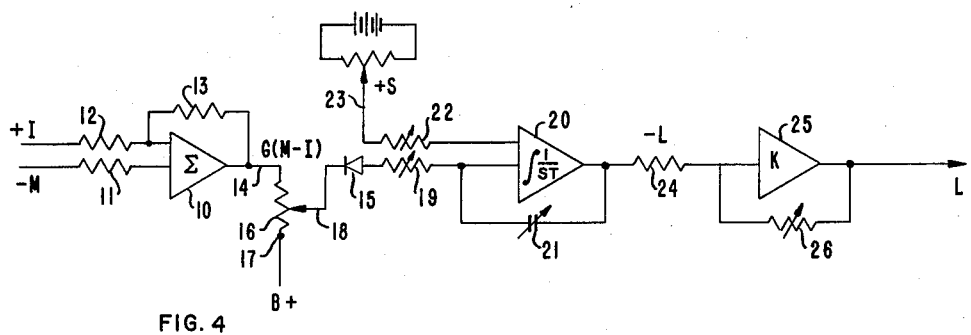
FIGURE 4 is a diagram showing a controller according to the invention using electrical signals.

Referring to FIGURE 4, there is shown an electric circuit suitable for use in the optimizing controller 2. It includes a differential amplifier 10 to which the measurement signals M and the preset signal I are supplied via resistors 11 and 12, respectively. The amplifier may have a feed-back circuit including a resistor 13. The output signal of this amplifier is provided at 14 and may be represented by $G(M-I)$, wherein G is the gain or amplification factor. G may be of the order of magnitude of 100 or over so as to provide a signal of high amplitude as soon as M becomes smaller than I.

Since the operational amplifier actually sums the input signals and also has a negative amplification, the measurement signal M is supplied in the form of a negative electrical signal, indicated in the drawings as "$-M$." This, together with the high gain, insures that the output signal as 14 has a high negative value when $M<I$. The output signal of the amplifier is zero or approximately zero when $M=I$ and is positive when $M>I$.

The amplified difference signal of the amplifier 10 is the driving signal and is passed to a diode 15 via potentiometer 16 which is connected at its terminal 17 to a source B of positive voltage. The diode blocks positive signals and allows only negative signals to pass. Adjusting or controlling the magnitude of the voltage B and/or the position of the contactor 18 introduces a threshold value for the signal going to the diode 15. The signal passed to the diode therefore becomes negative and the diode conducts only when the signal $G(M-I)$ at 14 exceeds a certain adjustable negative value. In this manner also any possibly disturbing noise level can be removed from the output signal of the amplifier 10. This noise may occur as fluctuations in M due to random process changes and/or due to lag in the control exerted by the controller 1.

The signal let through by the diode 15 is passed via a resistor 19 to an integrating amplifier 20 having an adjustable feed-back circuit 21. This amplifier also receives, via a resistance 22, a positive electric signal S from a source 23 having a constant, relatively low amplitude. The resistor 19 is preferably made adjustable, whereby the rate of change in the integrated signal can be adjusted. For the same reason the signal S may be made adjustable or the resistance 22 made variable.

The polarity of the integrated output signal of the integrator 20 is first reversed and adjustably amplified by passing the output signal via a resistance 24 to an amplifier 25 having an adjustable back-coupling potentiometer 26. The output signal of this amplifier is the signal L by which, for example, the manipulated input K in FIGURE 1 is controlled.

It is seen that the circuit includes essentially a difference amplifier which amplifies the difference between the momentary and desired values of the measured variable;

a blocking device, exemplified as a diode, which blocks the difference signal when the latter has one polarity and passes it when of the other polarity; and an integrating circuit which produces an output signal by integrating any signal from the blocking device together with a signal of relatively small amplitude having a polarity opposite to that passed by the blocking device to the integrating circuit. The bias or threshold voltage introduced by the elements 16–18 and the polarity-reversing amplifier 25 are usually desirable to overcome the effect of noise but not in every case essential.

Operation is as follows: So long as $M \geq I$ (and also in the case in which $M < I$ but $G(M-I)$ is still below the threshold value) the diode 15 blocks each signal and the integrator 20 is fed only by the low-amplitude positive signal S. During this phase the signal L increases slowly and steadily in a positive direction, and K is similarly increased slowly.

When, however, $M < I$ and the threshold value is exceeded, e.g., when controller 1 can no longer maintain $M = I$, the integrator 20 is supplied via the resistance 19 with a relatively large negative signal, which strongly overrides the positive signal S. The integrator now integrates a large negative signal which is essentially the amplified difference signal and, as a consequence, the magnitude of the signal L decreases rapidly. In the process shown in FIGURE 1 the magnitude of the manipulated input K is slowly increased in the situation described in the preceding paragraph by the slowly increasing signal L but is reduced rapidly in the latter situation.

The speeds of the changes in L can be matched to the process dynamics by adjusting the values of S and/or the resistor 22, and the resistor 19.

Figure 2:
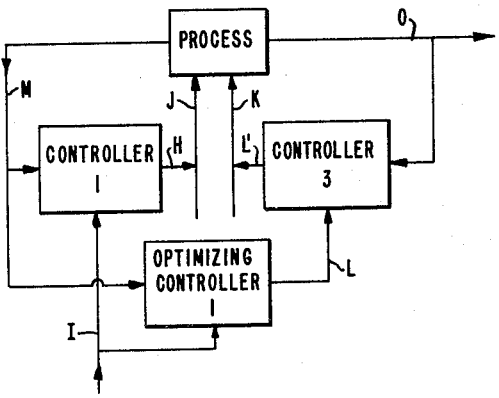
FIGURE 2 is a view similar to FIGURE 1 showing a modified arrangement.

As applied to the case of FIGURE 2, a similar result ensues, save that the signal L is applied to control the variable K indirectly, via the loop 3 which is further influenced by the signal 0 and produces a final control signal L'.

It is evident that M may be a measurement of any other variable, e.g., the output, or a function, such as the product of the output quantity and the quality. The principles described above are the same.

Figure 5:
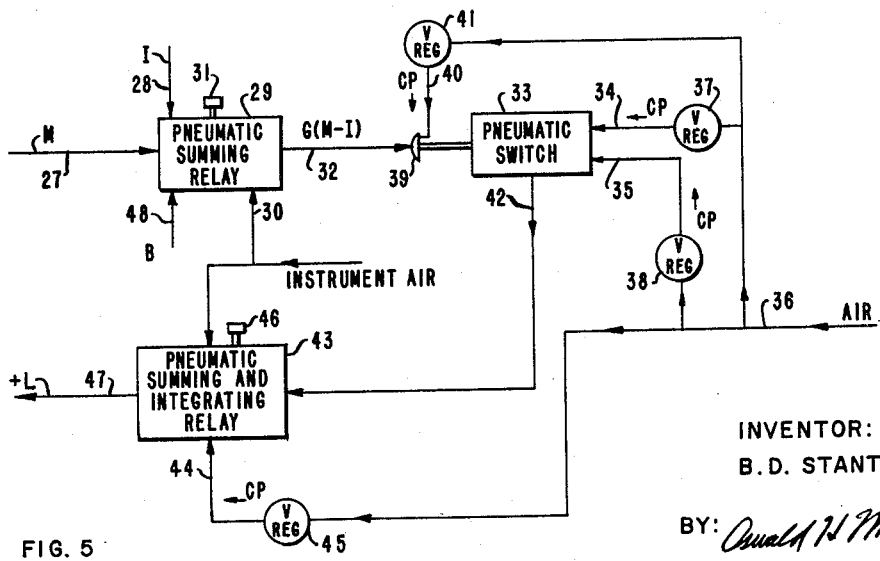
FIGURE 5 is a diagram showing a controller according to the invention using pneumatic signals.

FIGURE 5 is a diagram of a fully pneumatic system for performing functions which are broadly the same as those described above in connection with FIGURE 4. The signals M and I are supplied as pneumatic pressures via lines 27 and 28, respectively, to a pneumatic device 29 of the type known in the art as a pneumatic summing relay. This device may be supplied with plant instrument air via a line 30 and usually has a knob 31 for adjusting the gain. It compares the signals M and I and emits via a line 32 a pneumatic pressure difference signal determined thereby. This is the driving signal. Normally this signal assumes one or the other of two different pressures, e.g., zero and 20 p.s.i.g. The device 29 may, however, be of the type which emits a signal $G(M-I)$ wherein G, again, represents the amplification factor.

The line 32 is connected to control a pneumatic switch 33 to which air under two different, constant pressures are supplied via lines 34 and 35 from a common source 36 through pressure regulators 37 and 38. The switch includes a pressure-responsive element 39 to which control air pressure is admitted via line 40 and pressure regulator 41. The element 39 is quick-acting to assume either of two positions and connects the switch output line 42 either to the input line 34 or to the input line 35 but never to both. The line 42 is connected to a pneumatic summing and integrating relay 43 to which instrument air is supplied from the line 30 and air at a regulated low pressure is supplied via a line 44 from a pressure regulator 45 (or which may include a pressure-reducing element). The relay 43 has a knob 46 by which the integrating time factor can be varied. This relay determines the difference between the pressure in the lines 44 and 42 and integrates the difference thus determined. Because the pressure in the line 42 is either that in line 33 or that in line 35, the result of the integration, which appears as a pneumatic pressure signal in the line 47, is the result of the integration of the difference between the pressure in line 44 and either that in 34 or 35. The signal in line 47 is the output signal L and is connected to a suitable controller, such as a valve operator, to control the manipulated input K.

By way of a specific example, it may be assumed that instrument air is available at a pressure of 20 p.s.i.g., that the linear range 3–15 p.s.i.g. is used (so that pressure of 3, 9 and 15 p.s.i.g. respectively represent values of −6, 0 and +6 p.s.i.g.). The pressure regulators are all adjustable, and may, for example, be set to make the pressures in the lines 34 and 35 9.2 and 6.0 p.s.i.g., respectively, and the reference pressure in the line 44 9.0 p.s.i.g. The last is between the two former ones but nearer one than the other. So long as $M \geq I$ the pressure in the line 31 is at one value, say 0 p.s.i.g., and when $M < I$ it is at the other value, say 20 p.s.i.g. The control pressure in the line 40 may be 9 p.s.i.g. In the former situation, when the measured variable M has a favorable value, the switch 33 connects the line 34 to the line 42 and the relay 43 integrates the small positive value of 0.2 p.s.i.g., resulting in a steadily and slowly rising pressure L in the output line 47. This gradually drives the manipulated input K upwards. In the latter situation, when M is unfavorable, the switch 33 supplies a pressure of 6 p.s.i.g. to the line 42 and the relay 43 integrates the larger, negative difference of 3 p.s.i.g. The pressure L falls rapidly in the output line 47. This rapidly drives the input K downwards. By adjusting the pressure in the line 44 the pressure differences which are integrated in the device 43 can be varied, and adjustment of the knob 46 permits the time constant to be changed. It is evident that the operation is similar to that described with reference to FIGURE 4.

A threshold pressure, in the form of a pneumatic pressure B, may be supplied to the pneumatic relay 29 via a line 48. This is applied internally to act in the same sense as the signal M, so that the pressure in the line 32 is maintained at its lower value even when M is unfavorable but the difference is smaller than the threshold value. It may be noted that permanently set or adjustable signals, representing I and/or B, may be introduced by other means, for example, by mechanical pressures, such as spring tensions.

The pneumatic elements used in this system are known per se and commercially available and are not, therefore, described in detail. For example, a relay capable of performing the functions of relays 29 and 43 is known in the art as an M/F relay, Model No. 680 manufactured by Moore Products Company, of Philadelphia, Pa., described in the Moore Products bulletin 681 (1954). Other suitable relays are described in bulletin 1–35 (1960) of the Foxboro Company Foxboro, Mass.

It is evident that when the pneumatic relay 29 emits a continuously variable output signal (instead of a two-valued function as in the example) the switch 33 is nevertheless of the type which connects only one of the inputs to its output, depending upon whether the pressure in the line 32 is greater than or smaller than a given value, say the control pressure of 9 p.s.i.g. supplied via the line 40.

Figure 6:
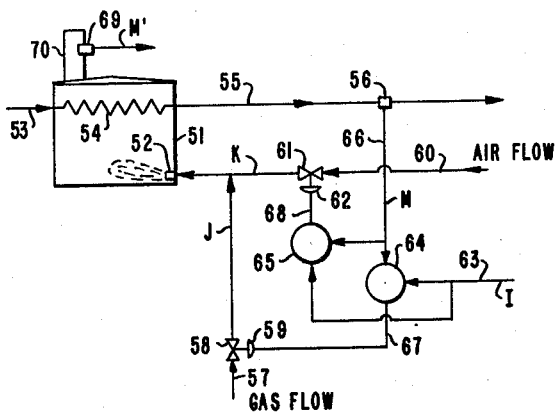
FIGURE 6 is a diagrammatic view of a furnace to which a controller according to the invention is applied.

FIGURE 6 shows a schematic arrangement of the optimizing controller as applied to a furnace 51 containing a burner 52 for heating fluid admitted at 53 and passed through a heating coil 54. The heated fluid flows through a pipe 55 and the temperature (constituting the constrained variable) thereof is measured by an instrument 56. Fuel, e.g., gas, is supplied to the burner via a pipe 57 under control of a valve 58 having a valve operator 59. Combustion air is supplied to the burner via a pipe 60 under control of a valve 61 having a valve operator 62. The manipulated inputs are, therefore, J (the rate of flow of fuel gas) and K (the rate of flow of air). A signal I, representing the desired minimum value of M, is supplied via a line 63, either in electrical or penumatic or other form.

The control includes a conventional controller 64 (corresponding to controller 1 of FIGURE 1) and an optimizing controller 65 (corresponding to controller 2 of FIGURE 1). Both receive the measured value of M, via line 66 and the signal I. The controller 64 positions the valve 58 by an output signal transmitted via a line 67 and the controller 65 positions the valve 61 by an output signal transmitted via a line 68 and the operator 62.

As was already explained in detail in general terms with reference to FIGURE 1, the controller 64 maintains the desired temperature M in accordance with the desired value set by the signal I by determining the difference between the desired and measured values and controlling the flow of gas in the pipe 57 accordingly.

The optimizing controller 65 according to the invention controls the combustion air flow in the pipe 60 to maintain the proper air-gas ratio. This result is achieved (assuming excess air at the start) by the action of the controller 65 which reduces the combustion air flow continually and slowly. As a consequence the temperature undergoes a transitory rise, which is counteracted by the controller 64, which decreases the gas flow rate whenever M exceeds I, so as to maintain a constant temperature. This leads to improvement in the combustion efficiency, which is here the quantity to be maximized. When the optimal point is passed and the temperature falls the controller 64 will again start to increase the amount of gas in order to compensate for the drop in temperature. Since, however, there is now insufficient air flow the temperature will decrease further, as a result of incompletely burnt fuel gas. The optimizing controller 65 then senses a falling-off in the temperature ($M<I$) and rapidly changes its output signal toward the direction to increase the air flow. The air-flow is increased rapidly to cause the temperature M to rise. As soon as it rises to above I the controller 64 again reduces the gas rate and the optimizing controller again reverses its operation; the control described above is then repeated. The system then oscillates about the point reached which is the optimum air-gas ratio and thus the most efficient operational point for the furnace.

Figure 7:
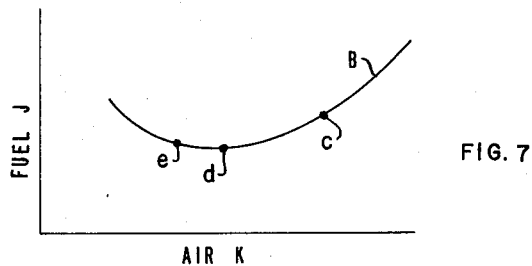
FIGURE 7 is a graph illustrating a possible relation between J and K in the system of FIGURE 6.

The operation of FIGURE 6 is illustrated by the graph shown in FIGURE 7, wherein the curve B gives the relation between the inputs J and K, which are plotted or ordinates and abscissae, the objective of the optimizing being to hold J, representing cost by way of fuel consumption, at a minimum. The initial condition, wherein excess air was supplied, is represented at point $c$. Optimizing controller 65 slowly decreases J to the optimal or desired point $d$, while the conventional controller 64 decreases K to maintain the temperature M constant. When the air flow is decreased below the point $d$, say to point $e$, the controller 64 senses a drop in M and increases the fuel flow; however, because this is ineffective to maintain M the optimizing controller reverses its operation to drive the operating point rapidly back beyond $d$ to or toward point $c$. The control cycle is then repeated.

It may be noted that this example differs from the previous one both in that the optimum is a minimum instead of a maximum and that one of the inputs itself is the quantity to be optimized.

The control system described may be extended to processes having a second measured or constrained variable, which may in this case be the smoke density of the furnace combustion gases. Accordingly, a smoke density-meter 69 may be provided in the furnace stack 70. The measured signal M', indicating the inverse (or negative) of smoke density, is fed to the integrator 20 (which is an element of controller 65), e.g., by a circuit shown in FIGURE 8.

Figure 8:
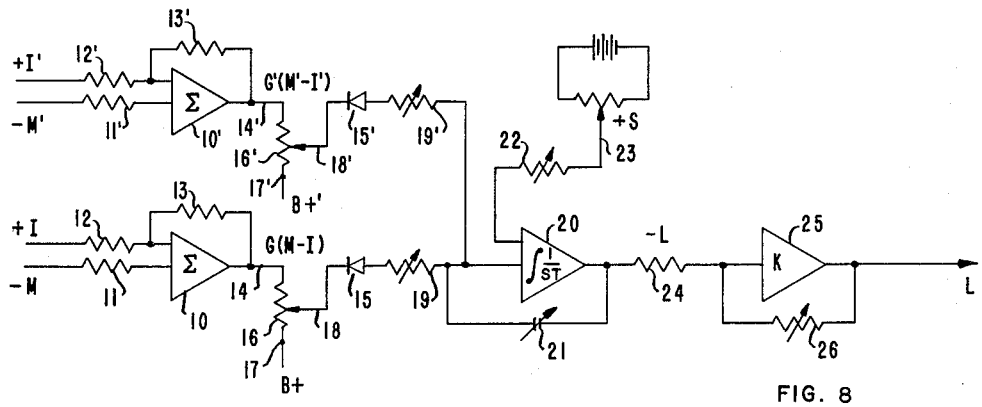
FIGURE 8 is a diagram similar to FIGURE 4 showing control by two measured variables.

Referring to FIGURE 8, reference numbers which are the same as those of FIGURE 4 denote like parts, and primed numbers denote added corresponding elements. The signal M' is fed via a resistor 11' to a differential amplifier 10' which also receives via a resistor 12' a signal I' indicating the desired smoke density. The output from the amplifier is a second difference signal which is applied via circuit elements 14', 16' and 18' to a diode 15' and thence, via a variable resistor 19' to the integrator 20. The diode 15' passes a signal only when the smoke level is excessive, i.e., $M'<I'$. When this condition prevails the integrator 20 receives a large negative input, which is integrated to increase L, thereby increasing the flow of combustion air. In this way furnace operating conditions are reached which are either optimal (minimum fuel consumption) if such is possible with respect to smoke development, or else just below the admissible limit of smoke development. This is of special interest in the case of burning liquid fuel.

From the foregoing description of two different embodiments, it is seen that the present invention provides a simplified control system for controlling a large number of processes by utilizing the measured value of at least one constrained variable to control a manipulated input in order to drive the process to an optimum point and hold it near said optimum although oscillating slightly about it. It will be clear that means other than those described may be used to perform the required functions of the present control system.

I claim as my invention:

1. An apparatus for optimizing the operation of a process having a plurality of independently controlled manipulated inputs and at least one constrained variable dependent upon said inputs which comprises: means for measuring said constrained variable; means for comparing the measured value of said constrained variable with a preset value and producing a difference signal; means connected to receive said difference signal for producing an output signal which varies slowly in one direction when the difference signal indicates a favorable relation of the measured value in relation to said preset value and varies rapidly in the opposite direction when the difference signal indicates an unfavorable relation; means for controlling one of said inputs in accordance with said measured value and said preset value; and means connected to receive said output signal for controlling the other of said inputs independently of said one input.

2. An apparatus for optimizing the operation of a process having a plurality of manipulated inputs and at least one constrained variable dependent upon said inputs, which comprises: means for measuring said constrained variable; a preset signal source; a summing means connected to said measuring means and said source for obtaining the difference between the measured value of said constrained variable and the preset signal and emitting a driving signal, said summing means having a relatively high gain; a low-amplitude signal source, the amplitude of the signal emitted thereby being low in comparison to the gain of the summing means; an integrating means for integrating the difference between said driving signal and said low-amplitude signal to produce an output signal; and control means responsive to said output signal for controlling one of said manipulated inputs.

3. In combination with the apparatus defined in claim 2, means responsive to said measured value of the constrained variable and the value of said preset signal for controlling another of said manipulated inputs directly in accordance with the relation between said values.

4. Apparatus as defined in claim 2 wherein said signals are electrical, the said summing device is an electrical differential amplifier and said integrator is an electrical integrator.

5. Apparatus as defined in claim 2 wherein said signals are pneumatic, the summing device is a pneumatic control device, and the integrating device is a pneumatic integrator.

6. An apparatus for optimizing the operation of a process having a plurality of manipulated inputs and at least one constrained variable dependent upon said inputs, which comprises: means for measuring said constrained variable and producing an electrical measurement signal; a source of a preset electrical signal representing a desired value of said constrained variable; means for controlling one of said manipulated inputs in response to the difference between said measured value and the desired value of said constrained variable; an electrical differential amplifier connected to said measuring means and to said signal source for producing an electrical difference signal, said amplifier having a relatively high gain; an electrical integrating amplifier having the input thereof connected to the output of said differential amplifier via a blocking device which transmits said difference signal only when of one polarity; a source of a steady electrical potential of polarity opposite to said polarity and having a low amplitude in relation to the gain of said amplifier, said low-amplitude source being also connected to the input of said integrating amplifier; and control means responsive to the output of said integrating amplifier for controlling another of said manipulated inputs.

7. In combination with the elements recited in claim 6, bias means interconnected between said differential amplifier and the blocking device for applying a signal of the said polarity to the latter only when the difference between the measured and preset signals exceeds a threshold value.

8. An apparatus for optimizing the operation of a process having a plurality of manipulated inputs and at least one constrained variable dependent upon said controlled variables, which comprises: means for measuring said constrained variable and producing a pneumatic measurement signal; means for controlling one of said manipulated inputs in response to the difference between said measured and a preset value for said constrained variable; a pneumatic summing relay disposed to supply a pneumatic driving signal determined by the relation between said measurement signal and a preset value therefor; a pneumatic switch responsive to said difference signal and disposed to connect a pneumatic output line therefrom selectively to either of two pneumatic inputs; means for supplying air at different pressures to said inputs; pneumatic integrating means connected to said output line for producing a pneumatic control signal which rises or falls depending upon the position of said switch; and control means responsive to said control signal for controlling another of said manipulated inputs.

9. An apparatus as defined in claim 8 wherein said integrating means includes means for supplying thereto a pneumatic reference signal having a pressure which is between said two air pressures but is closer to one than the other, said integrator being disposed to determine the difference between said reference signal and the signal in said output line and to integrate the determined difference.

10. An apparatus as defined in claim 8 wherein said pneumatic summing relay includes means for introducing a bias and constraining said driving signal assumes a value indicating an unfavorable relation of the measurement signal to the preset value only after diverging from the latter by an amount in excess of a threshold value.

11. An apparatus as defined in claim 8 wherein said pneumatic summing relay is of the type which produces a difference signal which has only one of two different pressures.

References Cited by the Examiner
UNITED STATES PATENTS

| | | | |
|---|---|---|---|
| 2,193,846 | 3/40 | Stevenson | 236—15 |
| 2,754,063 | 7/56 | Kersten | 328—1 |
| 3,017,749 | 1/62 | Heppler et al. | 328—127 |

OTHER REFERENCES

Effect of External Computing Impedances by G. A. Philbrick Researches Inc., Boston, Mass., 1 sheet, Sept. 20, 1962.

ARTHUR GAUSS, *Primary Examiner.*

GEORGE N. WESTBY, *Examiner.*